(12) United States Patent
Chang et al.

(10) Patent No.: US 6,408,138 B1
(45) Date of Patent: Jun. 18, 2002

(54) CAMERA VIEW-CORRECTION APPARATUS FOR TAKING PICTURES

(75) Inventors: Guang-Shang Chang, Taichung; Chien-Chin Chan, Hsinchu Hsien; Chien-Ming Peng, Hsinchu, all of (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 09/512,002

(22) Filed: Feb. 24, 2000

(51) Int. Cl.⁷ .............................................. G03B 13/02
(52) U.S. Cl. ........................ 396/373; 396/375; 396/377; 396/385
(58) Field of Search ................................ 396/373, 377, 396/383, 296, 386, 385, 375; 356/138, 247; 42/118, 111, 116, 120, 123, 131

(56) References Cited

U.S. PATENT DOCUMENTS

| | | | | |
|---|---|---|---|---|
| 2,420,252 A | * | 5/1947 | Land | 359/428 |
| 2,525,558 A | * | 10/1950 | Mihalyi | 396/377 |
| 2,604,002 A | * | 7/1952 | Wengel | 396/385 |
| 3,013,480 A | * | 12/1961 | Ferry | 396/293 |
| 3,240,107 A | * | 3/1966 | Prister | 396/373 |
| 4,544,252 A | * | 10/1985 | Tsukamoto | 396/287 |
| 5,218,396 A | * | 6/1993 | Morisawa | 396/147 |
| 5,335,033 A | * | 8/1994 | Ruben et al. | 396/375 |
| 5,727,239 A | * | 3/1998 | Hankawa et al. | 396/111 |

* cited by examiner

Primary Examiner—David M. Gray
(74) Attorney, Agent, or Firm—J. C. Patents

(57) ABSTRACT

The camera view-correction apparatus comprises at least one dividing plate located in the view finder so as to divide the view finder into several regions. Each region has a light source at the far end, so that when all the light sources are successively observed without being shielded by the dividing plate, it indicates that the optical axis of the view finder is matched with the optical axis of the lens. Alternatively, the camera view-correction apparatus has a plurality of plates located in the view finder. The plates enclose a tunnel free space with a cross shape for the cross-sectional view. Light can pass the tunnel free space and reach the eyes. If the optical axis of the view finder is tilted, some portion of the light is shielded by the plates with respect to the tilted direction.

17 Claims, 4 Drawing Sheets

CAMERA VIEW-CORRECTION APPARATUS FOR TAKING PICTURES

BACKGROUND OF THE INVENTION

1. Field of Invention

The present invention relates to a device for camera to take a view. More particularly, the present invention relates to an apparatus for correcting a view direction for a camera to take a view of objects.

2. Description of Related Art

FIG. 1 is a drawing, schematically illustrating a conventional automatic-focusing camera, such as a dual-eye camera, or a simple digital camera, which take a view of objects through a view finder when taking pictures. In FIG. 1, since the structure is greatly simplified, the lens 10 and the view finder 20 has a certain fixed distance. As a result, the actual object view 30 from the lens 10 is inevitably different from the object view 40 from the view finder 20 because the view points are separated by the distance. Usually, camera designers have always tried to reduce the distance between the view finder 20 and the lens 10 to minimize the view difference.

However, even if the camera designers can reduce the view difference, the view difference can also be induced by a deviation of view direction from eyes through the view finder. The view difference induced by the photographers is sever also.

FIG. 2 is a drawing, schematically illustrating the view difference induced by photographer's eyes. In FIG. 2, when the eye takes the view through the view finder 20 with an optical axis 60 deviating from a vertical optical axis 50 with respect to the lens 10. As a result, the object view 30' from the lens 10 is greatly different from the object view 40' from the view finder 20 along the optical axis 60. This phenomenon is natural for the photographer and is more obvious when the object is closer to the lens 10. Particularly, the photographer may often hold the camera with a tilted plane under absent mind. Practically, the view difference is more sever and more often occurring due to improper view point by the photographers without notice.

SUMMARY OF THE INVENTION

It is at least an object of the invention to provide a camera view-correction apparatus to correct an optical axis of a view finder, whereby the view finder can have the optical axis matching with an optical axis of lens. The view difference is effectively reduced.

It is at least another object of the invention to provide a camera view-correction apparatus using a correction mark installed in the view finder. The correcting mark provides information to the photographer when the eyes has a tilted optical axis from the optical axis of the lens.

It is at least still an object of the invention to provide a camera view-correction apparatus using a correction mark installed in the view finder. The photographer can view the object precisely in front of the lens using the correction mark. The view difference can be effectively reduced.

As embodied and broadly described herein, the invention provides a camera view-correction apparatus suitable use with a view finder. The camera view-correction apparatus comprises at least one dividing plate located in the view finder so as to divide the view finder into several regions. Each region has a light source at the far end, so that when all the light sources are successfully observed without being shielded by the dividing plate, it indicates that the optical axis of the view finder is matched with the optical axis of the lens.

The invention provides a camera view-correction apparatus suitable use with a view finder. The camera view-correction apparatus comprises a plurality of plates located in the view finder. The plates enclose a tunnel free space with a cross shape for the cross-sectional view. Light can pass the tunnel free space and reach the eyes. If the optical axis of the view finder is tilted, some portion of the light is shielded by the plates with respect to the tilted direction.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

In order to have a correct view direction from eyes, the invention provides a correction mark implemented in a view finder, so that eyes can adjust the view direction. The correction mark of the invention includes at least two light sources and at least one dividing plate.

First Embodiment

Figure 1:
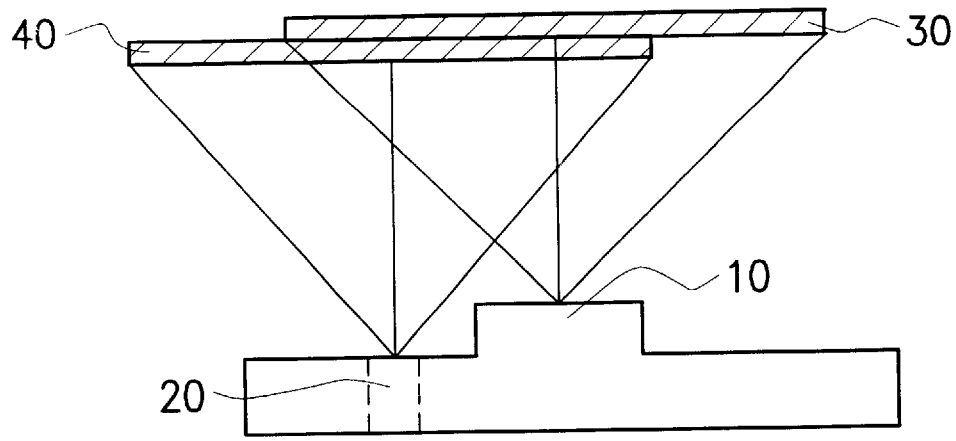
FIG. 1 is a drawing, schematically illustrating a conventional automatic-focusing camera, such as a dual-eye camera, or a simple digital camera, which take a view of objects through a view finder when taking pictures.
Figure 2:
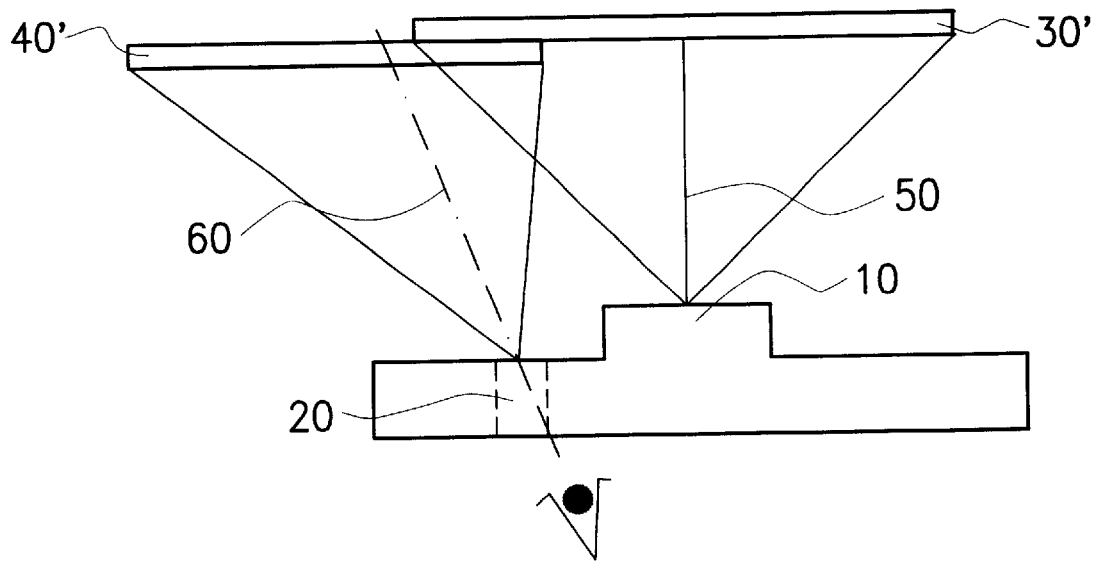
FIG. 2 is a drawing, schematically illustrating the view difference induced by photographer's eyes.
Figure 3A:
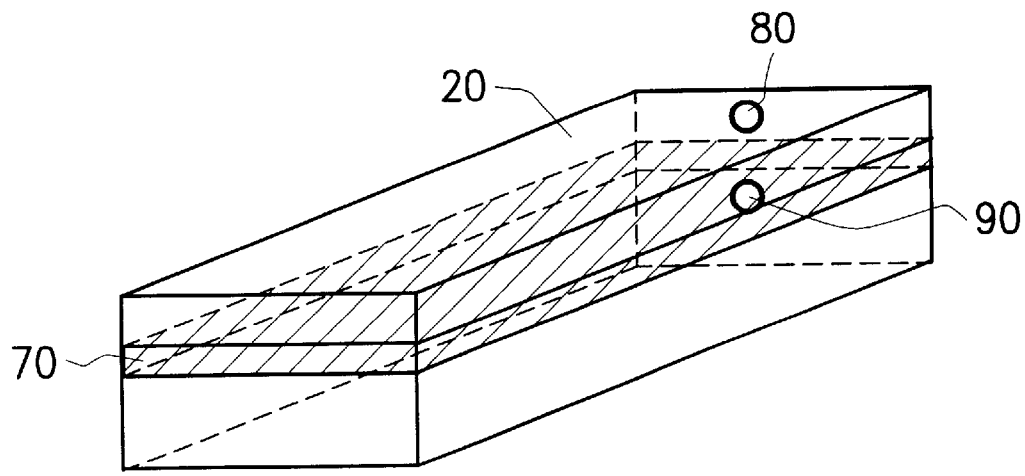
FIG. 3A is a perspective view, schematically illustrating a camera view-correction apparatus associating with a view finder with dividing plates used to correct the vertical view direction, according to a first preferred embodiment of the invention.

FIG. 3A is a perspective view, schematically illustrating a camera view-correction apparatus associating with a view finder with dividing plates used to correct the vertical view direction, according to a first preferred embodiment of the invention. In FIG. 3A, a view finder 20 is implemented with a correction mark. The correction mark includes light sources 80 and 90, and a dividing plate 70. For the vertical correction, the dividing plate is set by a horizontal manner, so as to divide the view finder 20 into an upper space and a lower space. The light source 80 is located in the upper space at one end toward the object, and the light source 90 is located in the lower space at the same end.

Figure 3B:
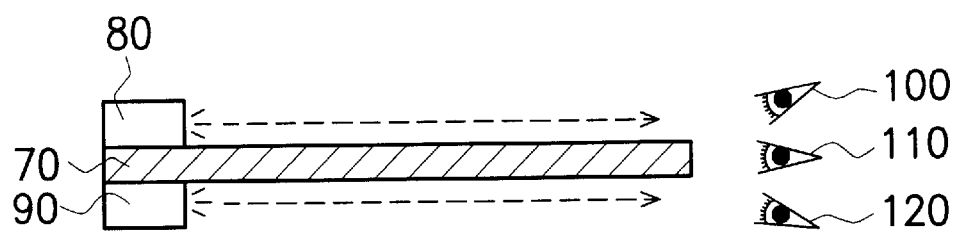
FIG. 3B is a side view, schematically illustrating a principle to correct the view direction for the camera view-correction apparatus, according to the first preferred embodiment of the invention.

FIG. 3B is a side view, schematically illustrating a principle to correct the view direction for the camera view-correction apparatus, according to the first preferred embodiment of the invention. In FIG. 3B, when the photographer takes pictures, the eye may view at different directions, such as the view directions 100, 110, 120. Since the light sources 80, 90 are located at the far end of the view finder 20 and are separated by the dividing plate 70, only the view direction 110 can simultaneously observe both the light sources 80, 90. If the view direction is tilted, not along to a long axis of the dividing plate 70, one of the light sources 80, 90 is shielded by the dividing plate 70. As a result the view direction 100 can only observe the light source 80. Similarly, the view direction 120 can only observe the light source 90. The view difference would severely occur, if the eye observes the object from the view directions 100 and 120. Therefore, by the correction mark of the invention, the eye can be set to the right direction match to the lens optical axis of the camera.

Figure 3C:
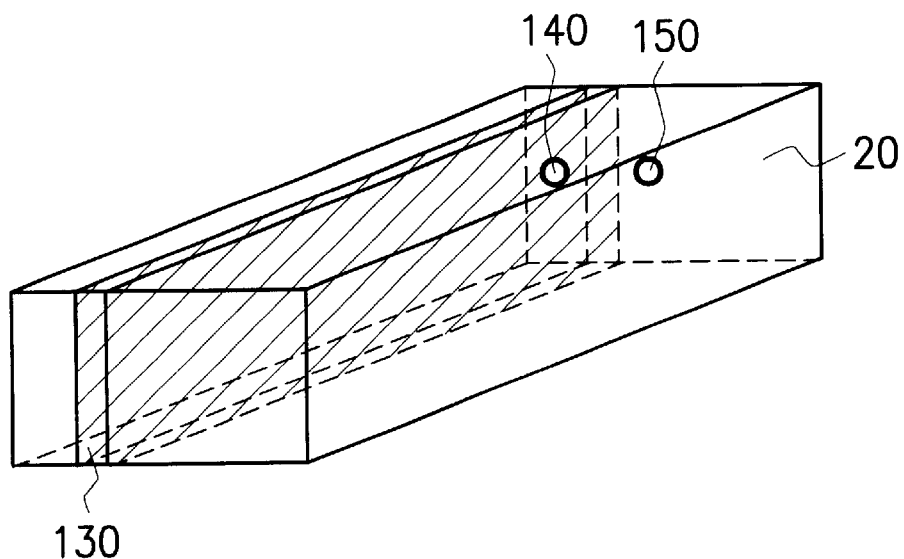
FIG. 3C is a perspective view, schematically illustrating a camera view-correction apparatus associating with a view finder with dividing plates used to correct the horizontal view direction, according to the first preferred embodiment of the invention.

Similarly, the correction for the horizontal view direction can be achieved by the same principle. FIG. 3C is a perspective view, schematically illustrating a camera view-correction apparatus associating with a view finder with dividing plates used to correct the horizontal view direction, according to the first preferred embodiment of the invention. The view finder 20 is implemented with the correction mark, which includes at least two light sources 140, 150, and a dividing plate 130. The plane of the dividing is set vertically. Now, the light source 140 is located on a left side of the dividing plate 130, and the light source 150 is located on the right side of the dividing plate 130. The dividing plate 130 divide the view finder into a left space and a right space.

Figure 3D:
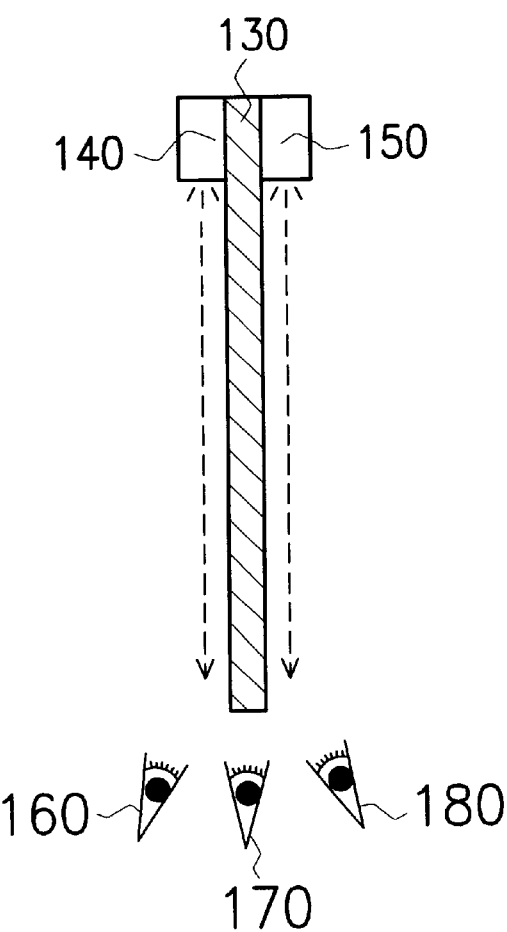
FIG. 3D is a side view, schematically illustrating a principle to correct the view direction for the camera view-correction apparatus, according to the first preferred embodiment of the invention.

FIG. 3D is a side view, schematically illustrating a principle to correct the view direction for the camera view-correction apparatus, according to the first preferred embodiment of the invention. In FIG. 3D, when the photographer takes pictures, the eye may view at different directions, such as the view directions 160, 170, 180. Since the light sources 140, 150 are located at the far end of the view finder 20 and are separated by the dividing plate 130, only the view direction 170 can simultaneously observe both the light sources 140, 150. If the view direction is tilted, not along to a long axis of the dividing plate 130, one of the light sources 140, 150 is shielded by the dividing plate 130. As a result the view direction 160 can only observe the light source 140. Similarly, the view direction 180 can only observe the light source 150. The view difference would severely occur, if the eye observes the object from the view directions 160 and 180. Therefore, by the correction mark of the invention, the eye can be set to the right direction match to the lens optical axis of the camera.

With the same principle above, the horizontal correction and the vertical correction can be simultaneously achieved by including the vertical dividing plate and the horizontal dividing plate, so that the view finder can be divided into several spaces horizontally and vertically. Several light sources are located in each of the spaces. When all the light sources are observed simultaneously, it indicates that the view direction is on the right directing matching to the lens optical axis.

Figure 3E:
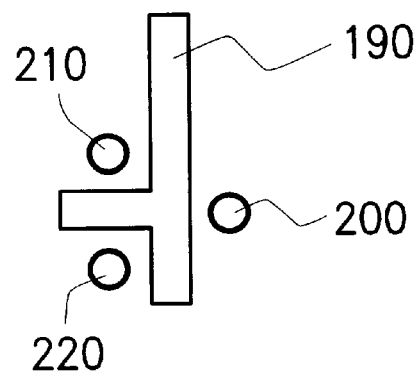
FIG. 3E is a cross-sectional view, schematically illustrating a camera view-correction apparatus associating with a view finder with dividing plates used to correct both the horizontal and vertical directions, according to the first preferred embodiment of the invention.

FIG. 3E is a cross-sectional view, schematically illustrating a camera view-correction apparatus associating with a view finder with dividing plates used to correct both the horizontal and vertical directions, according to the first preferred embodiment of the invention. In FIG. 3E, an example of the correction mark with a T-like structure for both the horizontal direction and the vertical direction is schematically illustrated. In FIG. 3E, a dividing plate 190 is arranged to have a vertical plate and a horizontal plate, so that the view finder 20 is divided into three spaces. Each of the spaces is implemented with a light source. In this example, two light sources 210 and 220 are arranged to be located on the both sides of the horizontal plate, so as to correct the vertical view direction. In order to reducing the number of light sources used in the correction mark, the light sources 210, 220 are arranged on the same side of the vertical plate. In this manner, only one additional light source 200 is necessary to be located on the other side of the vertical plate. When all three light sources are simultaneously observed by the eye, it indicated the view direction is on the right direction matching the lens optical axis, horizontally and vertically.

Generally, the two dividing plates are not absolutely necessary to be vertical to each other. It can also achieve the same function, once the two planes of the dividing plates are tilted to each other. The light sources can be more than three. However, three light source is the best choice to achieve the purpose with the simplified structure. In the practical applications, all of the factors, such as a smaller light source dimension, a longer dividing plate, and a closer distance of the light source to the dividing plate, can improve the correction effects.

Second Embodiment

Figure 4:
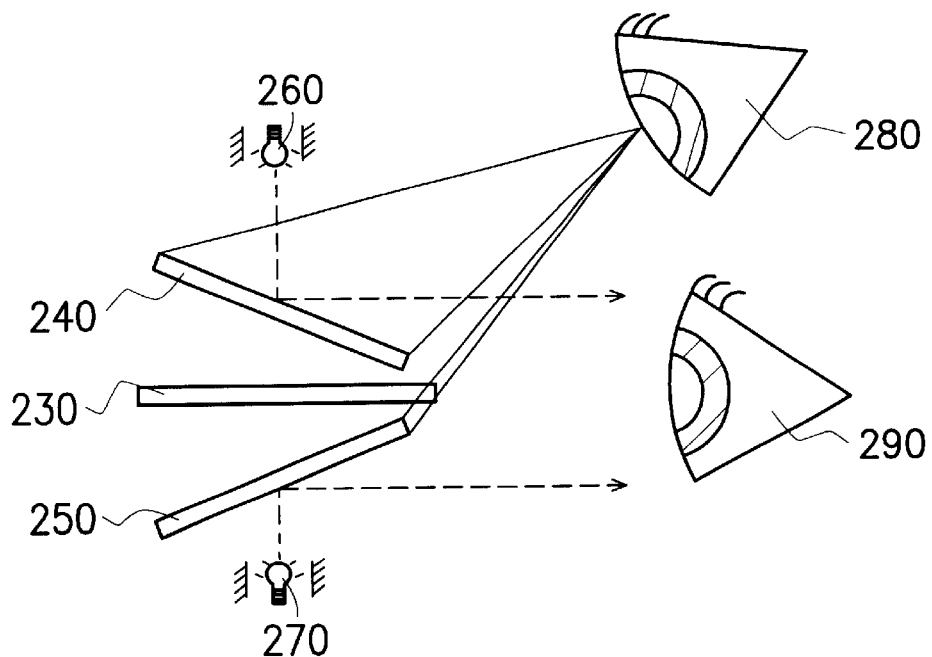
FIG. 4 is a drawing, schematically illustrating a camera view-correction apparatus associating with a view finder, according to a second preferred embodiment of the invention.

The correction mark can also be arranged in a different manner. FIG. 4 is a drawing, schematically illustrating a camera view-correction apparatus associating with a view finder, according to a second preferred embodiment of the invention. In FIG. 4, a reflection type correction mark is implemented in the view finder 20 (see FIG. 3A). The reflection type correction mark includes, for example, two the light sources 260 and 270, two reflection plate 240 and 250, and a dividing plate 230. The two light sources 260 and 270 are separately located on the both sides of the dividing plate 230 but not at the far end of the view finder. The light sources 260 and 270 may not be directly observed by the eye. In order to the observe the light sources 260 and 270, the reflection plates 240, 250 are located between the dividing plate 230 and the light sources 260, 270. The reflection plates 240, 250 also have a tilted angle from the dividing plate 230, so that the light sources 260, 270 can be reflected by the reflection plates 240, 250 into the eye. If the eye is at the view direction 290, both the light sources 260, 270 are observed by the eye through the reflection plates 240, 250. However, if the light sources 260, 270 may also be directly observed by the eye if the light sources 260, 270 is put sufficiently close to the dividing plate 230. Similarly, if the view direction is tilted, such as the view direction 280, only the light source 260 is observed. The view difference severely occurs at the view direction 280.

With the similar structure, two sets of corrections marks on two independent directions, such as the horizontal and the vertical directions, can be easily achieved also.

Third Embodiment

Figure 5:
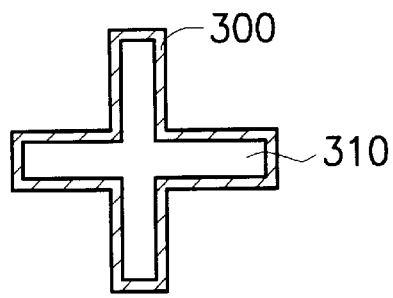
FIG. 5 is a cross-sectional view, schematically illustrating a camera view-correction apparatus associating with a view finder, according to a third preferred embodiment of the invention.

FIG. 5 is a cross-sectional view, schematically illustrating a camera view-correction apparatus associating with a view finder, according to a third preferred embodiment of the invention. In FIG. 5, a cross-tunnel-type reflection mark is schematically illustrated. The dividing plate 300 is arranged to enclose a tunnel space 310 in the view finder 20 (see FIG. 3A). The space 310 has a cross-like geometrical structure. The dividing plate 300 forms a tunnel, which has a cross-like geometric structure at the cross-sectional view in this embodiment. In this embodiment, there may be no need of an additional light source. The light source may come from the environment. However, a planar light source can enter the space 310 and reach the eye. When the eye observers the objects through the view finder 20, the eye can see the light source with a structure conformal to the inner wall of the dividing plate 300, so that the light source has a cross-like structure consistent with the space 310. If the view direction is tilted, it is the natural physical phenomenon that one light bar of the cross-like structure 310 would disappear due to the shield from the dividing plate 300. Only when the cross-like geometrical structure is well observed, the view direction is precisely set along the view direction matching to the lens optical axis.

The narrower of the light arms of the cross-like structure, the more precise the view direction. If only one direction of the view direction is necessary to be corrected, the cross-like structure can also be reduced into one horizontal structure or a vertical structure, a cross(+)-like structure, or a T-like structure as previously discussed. In fact, an L-like structure or a T-like structure are also another choices.

Fourth Embodiment

Figure 6:
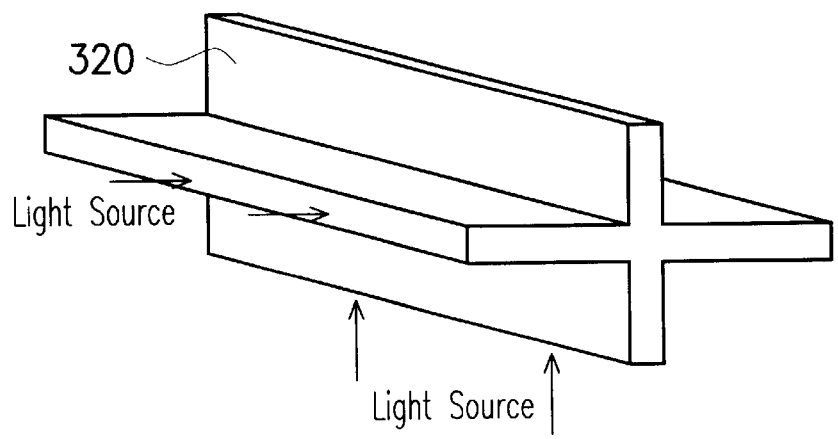
FIG. 6 is a drawing, schematically illustrating a camera view-correction apparatus associating with a view finder, according to a forth preferred embodiment of the invention.

FIG. 6 is a perspective view, schematically illustrating a camera view-correction apparatus associating with a view finder, according to a forth preferred embodiment of the invention. In FIG. 6, a light-guide correction mark is illustrated. The light-guide correction mark includes a light guiding plate 320 with a two-directional structure, such as a cross (+)-like structure form the cross-sectional view, is implemented in the view finder. In this embodiment, the light can enter the light-guide 320 from the side at the two directions. When the eye observes the object through the view finder, if the view direction is tilted, as previously discussed, one direction of the light would miss. Only when the cross-like geometrical structure is well observed, the view direction is precisely set along the view direction matching to the lens optical axis.

The narrower of the light guide, the more precise the view direction. If only one direction of the view direction is necessary to be corrected, the cross-like structure can also be reduced into one horizontal structure or a vertical structure, a cross(+)-like structure, or a T-like structure, as previously discussed. In fact, an L-like structure is also another easy structure.

In the invention, various types of correction marks are introduced. By a proper arrangement of geometric structure of the correction mark, the view direction of eye can be adjusted to the best direction by simply observing the correction mark to see whether the correction mark is well observed. Any tilted view direction would cause a missing portion of the geometric structure of the correction mark. The correction mark preferably includes a horizontal correction and a vertical correction simultaneously.

Moreover, a cross-sectional dimension of the correction mark is tiny when the view direction is on the directing along the dividing plate. The correctional mark does not block the objects within the view finder.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A camera view-direction correction device, associating with a view finder to allow an eye to take a view correction precisely matching to a lens optical axis, the correction device comprising:

at least one dividing plate implemented in the view finder, wherein the view finder is divided into at least two spaces; and at least two light sources separately located in the at least two spaces, wherein when the at least two light sources are simultaneously observed by the eye, it indicates a correct view-direction is achieved.

2. The correction device of claim 1, wherein the at least one dividing plate comprises two dividing plates, which are arranged to have a T-like structure, in which the at least two light sources comprises three light sources at a far end of the view finder relative the eye.

3. The correction device of claim 1, wherein the at least one dividing plate comprises one dividing plate used for correcting a horizontal view direction by putting the one dividing plate vertically.

4. The correction device of claim 1, wherein the at least one dividing plate comprises one dividing plate used for correcting a vertical view direction by putting the one dividing plate horizontally.

5. A camera view-direction correction device, associating with a view finder to allow an eye to take a view correction precisely matching to a lens optical axis, the correction device comprising:

at least one dividing plate implemented in the view finder, wherein the view finder is divided into at least two spaces;

at least two light sources separately located at the two spaces, and when the two light sources are simultaneously observed by the eye, it indicates that a correct view-direction is achieved; and at least two reflection plates separately located between the two light sources and the one dividing plate, so that the two light sources can be simultaneously reflected to the eye through the two reflection plates when the correct view-direction is achieved, wherein the two light sources are put at both sides of the dividing plate so that the light sources can be reflected by the reflection plates.

6. The correction device of claim 5, wherein the two reflection plates are arranged in such a way that a tilted angle is formed to achieve a two-directional correction.

7. The correction device of claim 2, wherein the two dividing plates are perpendicular to each other to achieve a two-directional correction.

8. A camera view-direction correction device, associating with a view finder to allow an eye to take a view correction precisely matching to a lens optical axis, the correction device comprising:

a plurality of dividing plates, which enclose a tunnel space in the view finder, wherein a cross-sectional geometric structure of the tunnel space comprises two bar-like structures intersecting to each other with an intersection angle of 90 degrees, wherein a planar light source can enter the tunnel space and reach the eye, and when the cross-sectional geometric structure of the tunnel space is fully observed, it indicates that the view direction is substantially matching to the lens optical axis.

9. The correction device of claim 8, wherein the two bar-like structures form a geometric structure at a cross-sectional view, which is selected from one of a group consisting of a T-like structure, an L-like structure, and a cross(+)-like structure.

10. The correction device of claim 8, wherein the at least one bar-like structure comprises one bar-like structure arranged horizontally.

11. The correction device of claim 8, wherein the at least one bar-like structure comprises one bar-like structure arranged vertically.

12. A camera view-direction correction device, associating with a view finder to allow an eye to take a view correction precisely matching to a lens optical axis, the correction device comprising:

at least one light-guide plate implemented in the view finder extending along a direction on a cross-sectional plane of the view finder, wherein a light source can enter the light-guide plate from sides and reach the eye, and when the light source in the light-guide plate is fully observed by the eye, it indicates that the view direction is substantially matching to the lens optical axis.

13. The correction device of claim 12, wherein the least one light-guide plate comprises two light-guide plates intersecting to each other with an intersecting angle.

14. The correction device of claim 13, wherein the intersecting angle is 90 degrees.

15. The correction device of claim 13, wherein the two light-guide plates form a geometric structure at a cross-sectional view, which is selected from one from a group consisting of a T-like structure, an L-like structure, and a cross(+)-like structure.

16. The correction device of claim 12, wherein the at least one light-guide plate comprises one light-guide plate set horizontally.

17. The correction device of claim 12, wherein the at least one light-guide plate comprises one light-guide plate set vertically.

* * * * *